(12) United States Patent
Kou et al.

(10) Patent No.: US 10,316,114 B2
(45) Date of Patent: Jun. 11, 2019

(54) END-FUNCTIONALIZED POLYMERS

(75) Inventors: Huiguang Kou, Mannheim (DE);
Andreas Moeck, Rheinfelden (DE);
Clemens Auschra, Freiburg (DE);
Peter Nesvadba, Marly (CH); Frank Oliver Heinrich Pirrung, Gruenstadt (DE); Andreas Gernandt, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 729 days.

(21) Appl. No.: 13/638,191

(22) PCT Filed: Mar. 29, 2011

(86) PCT No.: PCT/EP2011/054780
§ 371 (c)(1),
(2), (4) Date: Sep. 28, 2012

(87) PCT Pub. No.: WO2011/120947
PCT Pub. Date: Oct. 6, 2011

(65) Prior Publication Data
US 2013/0030071 A1 Jan. 31, 2013

Related U.S. Application Data

(60) Provisional application No. 61/318,798, filed on Mar. 30, 2010.

(30) Foreign Application Priority Data

Mar. 30, 2010 (EP) ..................................... 10158328

(51) Int. Cl.
*C08F 16/12* (2006.01)
*C08F 12/08* (2006.01)
(Continued)

(52) U.S. Cl.
CPC .................. *C08F 8/44* (2013.01); *C08F 8/00* (2013.01); *C08F 8/30* (2013.01); *C08F 8/42* (2013.01);
(Continued)

(58) Field of Classification Search
CPC .......... C08F 12/08; C08F 20/12; C08F 20/54; C08F 26/10; C08F 36/06; C08F 36/08;
(Continued)

(56) References Cited

U.S. PATENT DOCUMENTS 2,949,474 A * 8/1960 Murdoch ............. C07D 331/02
526/271
5,525,677 A * 6/1996 Jeong ........................ C08J 5/10
525/241

(Continued)

FOREIGN PATENT DOCUMENTS

GB 2 335 190 9/1999
GB 2 361 235 10/2001
(Continued)

OTHER PUBLICATIONS

Benoît Lessard and Milan Marić, "Effect of an Acid Protecting Group on the 'Livingness' of Poly(acrylic acid-ran-styrene) Random Copolymer Macroinitiators for Nitroxide-Mediated Polymerization of Styrene", Macromolecules 2008, 41, 7881-7891.*

(Continued)

*Primary Examiner* — Richard A Huhn
(74) *Attorney, Agent, or Firm* — Oblon, McClelland, Maier & Neustadt, L.L.P.

(57) ABSTRACT

This invention relates to end-functionalized living polymers or copolymers having a structure represented by the general formula 1 or 2, wherein $R_1$ is a hydrogen atom, a methyl group, or a radically non-polymerizable organic group containing 1 to 20 carbon atoms. $R_2$ is a functional end group of a vinyl hetero monomer selected from the group consisting of hydroxy, epoxy, silyl, $NH_2$, $NH(C_1-C_6 alkyl)$, $N(C_1-C_6 alkyl)_2$, —CH=$CH_2$, —C≡CH, —C($CH_3$)=$CH_2$, —O—CH=$CH_2$, (—O—$CH_2$—$CH_2$)$_{1-10}$—OH, —$OR_{20}$, —$COOR_{20}$, —$CONHR_{20}$, —$OCONHR_{20}$, —$OCOR_{20}$ and —NH—CO—$R_{20}$, wherein $R_{20}$ is linear or branched $C_1-C_{20}$ alkyl or linear or branched $C_1-C_{20}$ alkyl substituted with hydroxy, epoxy, silyl, $NH_2$ or $N(C_1-C_6 alkyl)_2$; or $R_{20}$ is phenyl, benzyl, —CH=$CH_2$, —C≡CH or —C($CH_3$)=$CH_2$, or $R_2$ is a residue of an acrylic acid ($CH_2$=CH—COO—*), methacrylic acid, ($CH_2$=C($CH_3$)—COO—*) or $CH(CH_3)$=CH—COO—* or $R_2$ is a residue of a dicarboxylic acid HOOC—$R_c$—COO—* or $C_1-C_6 alkyl$-OOC—$R_c$—COO—* wherein $R_c$ is $C_1-C_{20}$ alkylene, $C_1-C_{20}$ alkenylene or phenylene; or $R_2$ is a residue derived from the reaction of an isocyanate $R_a$—NCO with the hydroxy group or with the amine group of the vinyl hetero monomer, said residue being $R_a$—NHCOO—* or $R_a$—NHCO—NH—* wherein $R_a$ is unsubstituted $C_1-C_{20}$ alkyl, $C_1-C_{20}$ cycloalkyl or $C_1-C_{20}$ alkyl substituted with hydroxy, epoxy, silyl, $NH_2$, $NH(C_1-C_6 alkyl)$ or $N(C_1-C_6 alkyl)_2$; or $R_2$ is a residue derived from the reaction of a diisocyanate residue OCN—$R_b$—NCO with the hydroxy group or with the amine group of the vinyl hetero monomer, said residue being *—OOC—NH—$R_b$—NCO or *—HNOC—NH—$R_b$—NCO or *—OOC—NH—$R_b$—$NHCOR_{30}$ wherein $R_b$ is $C_1-C_{20}$ alkylene or $C_1-C_{20}$ cycloalkylene or phenylene and $R_{30}$ is a residue of hydroxyethylacrylate ($CH_2$=CH—COO—($CH_2)_2$—O*), hydroxyethylmethacrylate ($CH_2$=C($CH_3$)—COO—($CH_2)_2$—O*), hydroxybutylacrylate ($CH_2$=CH—COO—($CH_2)_4$—O*) or hydroxybutylmethacrylate ($CH_2$=C($CH_3$)—COO—($CH_2)_4$—O*), A is the hetero atom of the vinyl hetero monomer selected from the group consisting of oxygen, nitrogen, sulfur and silicon; and if $R_2$ is silyl and M is a direct bond, A is a direct bond; M is a bond or a divalent group linking the heteroatom of the vinyl hetero monomer and the functional end group of the vinyl hetero monomer said M being selected from the group consisting of $C_{1-50}$ (Continued)

alkylene, $C_{1-50}$ (hetero)alkylene, arylene and heteroarylene; X is a halogen atom, a nitroxide group or a sulphide group, $Z_n$ is a polymer or copolymer segment of random-, gradient- or block-type structure, which is built up from vinylic monomers selected from the group consisting of isoprene, 1,3-butadiene, $\alpha$-$C_{5-18}$alkene, 4-vinyl-pyridine, 2-vinyl-pyridine, vinyl-imidazole, N-vinylpyrrolidone, dimethyl-acrylamide, 3-dimethylamino-propylmethacrylamide, styrene, substituted styrene and a compound of formula $CH_2=C(R_3)-C(=R_4)-R_5$, wherein $R_3$ is a hydrogen atom or a methyl group, $R_4$ is oxygen atom or sulfur atom; $R_5$ is $NH_2$, hydroxy, unsubstituted $C_{1-18}$ alkoxy, $C_{2-100}$alkoxy interrupted by at least one N and/or O atom, hydroxy-substituted $C_{1-18}$alkoxy, unsubstituted $C_{1-18}$alkylamino, di($C_{1-18}$alkyl)amino, hydroxy-substituted $C_{1-18}$alkylamino, hydroxy-substituted di($C_{1-18}$alkyl)amino or $-O-CH_2-CH_2-N(CH_3)_2$; Y is the chain terminus of the polymer/copolymer $Z_n$ and Y represents the fragment of a polymerization initiator capable of initiating polymerization; Y1 represents a di-, tri- or polyvalent fragment of a di-, tri-, or polyfunctional NMP initiator; m is 2, 3 or 4, preferably 2; n is the number of monomer units Z and is between 10 and 5000.

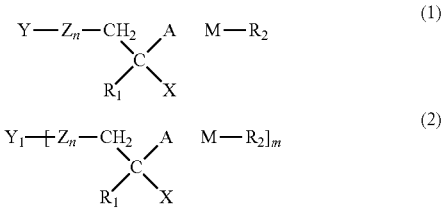

22 Claims, No Drawings

(51) Int. Cl.
    C08F 20/12    (2006.01)
    C08F 293/00   (2006.01)
    C08F 8/44     (2006.01)
    C08F 8/00     (2006.01)
    C08F 8/30     (2006.01)
    C08F 8/42     (2006.01)
    C08F 2/00     (2006.01)
    C08F 20/54    (2006.01)
    C08F 26/10    (2006.01)
    C08F 36/06    (2006.01)
    C08F 36/08    (2006.01)
(52) U.S. Cl.
    CPC .......... C08F 2/001 (2013.01); C08F 12/08 (2013.01); C08F 16/12 (2013.01); C08F 20/12 (2013.01); C08F 20/54 (2013.01); C08F 26/10 (2013.01); C08F 36/06 (2013.01); C08F 36/08 (2013.01); C08F 293/005 (2013.01); C08F 2438/02 (2013.01); C08F 2810/40 (2013.01)
(58) Field of Classification Search
    CPC ... C08F 2810/40; C08F 2438/02; C08F 16/12
    See application file for complete search history.

(56) References Cited

U.S. PATENT DOCUMENTS

| | | | | |
|---|---|---|---|---|
| 5,728,789 | A | * | 3/1998 | Wamprecht et al. .... C08K 5/17 525/327.4 |
| 6,117,961 | A | * | 9/2000 | Ogawa ......................... 526/347 |
| 2004/0167303 | A1 | * | 8/2004 | Kramer ..................... C08F 4/00 526/220 |
| 2007/0004880 | A1 | | 1/2007 | Nakagawa et al. |
| 2008/0003252 | A1 | * | 1/2008 | Lai .......................... A61L 27/34 424/423 |
| 2010/0308273 | A1 | * | 12/2010 | Yamago ................ C08F 120/14 252/301.35 |

FOREIGN PATENT DOCUMENTS

| | | |
|---|---|---|
| JP | 2000-44626 A | 2/2000 |
| JP | 2001-19770 A | 1/2001 |
| JP | 2001-261733 A | 9/2001 |
| JP | 2007-231033 A | 9/2007 |
| WO | 97 46593 | 12/1997 |
| WO | 98 58974 | 12/1998 |
| WO | 99 31144 | 6/1999 |
| WO | 03 004471 | 1/2003 |
| WO | 2004 085397 | 10/2004 |
| WO | 2005 059048 | 6/2005 |
| WO | 2005 118651 | 12/2005 |
| WO | 2008 003602 | 1/2008 |

OTHER PUBLICATIONS

Georges, M. K. et al. "Narrow Molecular Weight Resins by a Free-Radical Polymerization Process". Macromolecules 1993, 26, 2987-2988.*

Hawker, C. J. et al. "Initiating Systems for Nitroxide-Mediated 'Living' Free Radical Polymerizations: Synthesis and Evaluation". Macromolecules 1996, 29(16), 5245-5254.*

Synthesis of poly(vinyl ether) macromonomers using an iodine-free initiator. Goethals, E. J. et al., Makromol. Chem., Rapid Commun. 1990, 11(12), 623-627. (Year: 1990).*

Hilf, S., et al., "Sacrificial Synthesis of Hydroxy-Functionalized ROMP Polymers: An Efficiency Study," Macromolecules, vol. 41, pp. 6006-6011 (2008).

Fukui, H., et al., "Multifunctional Coupling Agents for Living Cationic Polymerization. IV. Synthesis of End-Functionalized Multiarmed Poly (vinyl ethers) with Multifunctional Silyl Enol Ethers," Journal of Polymer Science, vol. 32, pp. 2699-2708, (1994).

International Search Report dated Apr. 28, 2011 in PCT/EP11/54780 Filed Mar. 29, 2011.

Final Notification of Reasons for Refusal dated Sep. 1, 2014, in Japanese Patent Application No. 2013-501802 filed Mar. 29, 2011 (partial English translation only).

Second Office Action dated May 8, 2014, in Chinese Patent Application No. 201180016562.X filed Mar. 29, 2011 (partial English translation only).

N. Cardi, et al., "Controlled Free-Radical Polymerization: New Breath in a Mature Technology", Polymer News, vol. 30, pp. 110-119 (2005).

G. Moad, et al., "Toward Living Radical Polymerization", Accounts of Chemical Research, 10 pages (2008).

M. Destarac, "Controlled Radical Polymerization: Industrial Stakes, Obstacles and Achievements", Macromal. React. Eng., vol. 4, pp. 165-179 (2010).

* cited by examiner

END-FUNCTIONALIZED POLYMERS

This invention relates to end-functionalized living polymers, the preparation thereof and its use as building blocks in industrial applications.

End-functionalized polymers, as well as telechelic polymers, are widely used in industry as building blocks, such as telechelic polyether (PEGs, PPGs, poly-THFs), telechelic polyester (diol initiated polycaprolactones). However, there are few products based on nitroxide-mediated polymerization (NMP).

The end-functionalization of nitroxide mediated polymer via the monoaddition of maleic anhydride to NMP polymer is described by H. Eva, J. Hawker Macromolecules, 2001, 34, 3856.

The end-functionalization of nitroxide mediated polymer by treating the NMP polymer with acetic acid catalyzed by zinc is described by G. Chessa, A. Scrivanti, et al. Polymer, 2001, 42, 9347; or by J. Pradel, B. Boutevin, et al. J Polym. Sci. Part A, Polym. Chem., 2000, 38, 3293.

The International Publication WO 97/46593 discloses a method for preparing telechelic 1,3-diene oligomers that consists in effecting the free radical polymerization of at least one 1,3-diene with a heat sensitive polymerization initiator such as hydrogen peroxide in the presence of a stable nitroxide radical.

All these three approaches are not based on copolymerization.

The end-functionalization of ATRP polymer via the copolymerization of OH containing monomer is described by V. Coessens, J. Pyun, et al., in Macromol. Rapid Commun. 2000, 21, 103.

The publication US2007004880 (Kaneka) discloses vinyl polymers having a terminal functional group of the structure $-CH_2-C(X)(R_2)-R_1-R_3$ wherein $R_1$ is a divalent hydrocarbon group containing 1 to 20 carbon atoms, $R_2$ is a hydrogen atom or a methyl group $R_3$ is a hydroxy, amino, epoxy, carboxylic acid, ester, ether, amide or silyl group, an alkenyl group having low polymerizability, an organic compound having 1 to 20 carbon atoms, X is a halogen atom, a nitroxide or sulfide group or a cobalt porphyrin complex.

The object of the present invention is to have new end-functionalized polymers.

It has been found that new end-functionalized polymers can be obtained by adding a functional vinyl hetero monomer such as e.g. a vinyl ether monomer to a living radical polymerization system during polymerization or after completion of the polymerization.

Due to living polymer technology (preferably NMP technology) the functional polymer can be well-defined, such as molecular weight, block structure.

Due to the copolymerization of a functional vinyl ether monomer, a high degree of functionalization (>90%) can be obtained.

Due to no special purification equipment needed, this process is suitable for industrial manufacture.

Thus, the invention relates to a polymer or copolymer having a structure represented by the general formulae 1 or 2

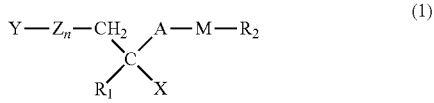 (1)

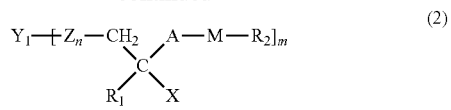 (2)

wherein $R_1$ is a hydrogen atom, a methyl group, or a radically non-polymerizable organic group containing 1 to 20 carbon atoms.

$R_2$ is a functional end group of a vinyl hetero monomer selected from the group consisting of hydroxy, epoxy, silyl, $NH_2$, $NH(C_1-C_6alkyl)$, $N(C_1-C_6alkyl)_2$, $-CH=CH_2$, $-C\equiv CH$, $-C(CH_3)=CH_2$, $-O-CH=CH_2$, $(-O-CH_2-CH_2)_{1-10}-OH$, $-OR_{20}$, $-COOR_{20}$, $-CONHR_{20}$, $-OCONHR_{20}$, $-OCOR_{20}$ and $-NH-CO-R_{20}$, wherein $R_{20}$ is linear or branched $C_1-C_{20}$ alkyl or linear or branched $C_1-C_{20}$ alkyl substituted with hydroxy, epoxy, silyl, $NH_2$ or $N(C_1-C_6alkyl)_2$; or $R_{20}$ is phenyl, benzyl, $-CH=CH_2$, $-C\equiv CH$ or $-C(CH_3)=CH_2$, or $R_2$ is a residue of an acrylic acid ($CH_2=CH-COO-*$), methacrylic acid, ($CH_2=C(CH_3)-COO-*$) or $CH(CH_3)=CH-COO-*$ or $R_2$ is a residue of a dicarboxylic acid $HOOC-R_c-COO-*$ or $C_1-C_6alkyl-OOC-R_c-COO-*$ wherein $R_c$ is $C_1-C_{20}$ alkylene, $C_1-C_{20}$alkenylene or phenylene;

or $R_2$ is a residue derived from the reaction of an isocyanate $R_a-NCO$ with the hydroxy group or with the amine group of the vinyl hetero monomer, said residue being $R_a-NHCOO-*$ or $R_a-NHCO-NH-*$ wherein $R_a$ is unsubstituted $C_1-C_{20}alkyl$, $C_1-C_{20}cycloalkyl$ or $C_1-C_{20}alkyl$ substituted with hydroxy, epoxy, silyl, $NH_2$, $NH(C_1-C_6alkyl)$ or $N(C_1-C_6alkyl)_2$;

or $R_2$ is a residue derived from the reaction of a diisocyanate residue $OCN-R_b-NCO$ with the hydroxy group or with the amine group of the vinyl hetero monomer, said residue being $*-OOC-NH-R_b-NCO$ or $*-HNOC-NH-R_b-NCO$ or $*-OOC-NH-R_b-NHCOR_{30}$ wherein $R_b$ is $C_1-C_{20}$ alkylene or $C_1-C_{20}cycloalkylene$ or phenylene and $R_{30}$ is a residue of hydroxyethylacrylate ($CH_2=CH-COO-(CH_2)_2-O^*$), hydroxyethylmethacrylate ($CH_2=C(CH_3)-COO-(CH_2)_2-O^*$), hydroxybutylacrylate ($CH_2=CH-COO-(CH_2)_4-O^*$) or hydroxybutylmethacrylate ($CH_2=C(CH_3)-COO-(CH_2)_4-O^*$), A is the hetero atom of the vinyl hetero monomer selected from the group consisting of oxygen, nitrogen, sulfur and silicon; and if $R_2$ is silyl and M is a direct bond, A is a direct bond;

M is a bond or a divalent group linking the heteroatom of the vinyl hetero monomer and the functional end group of the vinyl hetero monomer said M being selected from the group consisting of $C_{1-50}$ alkylene, $C_{1-50}$ (hetero)alkylene, arylene and heteroarylene;

X is a halogen atom, a nitroxide group or a sulphide group;

$Z_n$ is a polymer or copolymer segment of random-, gradient- or block-type structure, which is built up from vinylic monomers selected from the group consisting of isoprene, 1,3-butadiene, $\alpha$-$C_{5-18}$alkene, 4-vinyl-pyridine, 2-vinyl-pyridine, vinyl-imidazole, N-vinylpyrrolidone, dimethyl acrylamide, 3-dimethylamino-propylmethacrylamide, styrene, substituted styrene and a compound of formula $CH_2=C(R_3)-C(=R_4)-R_5$, wherein $R_3$ is a hydrogen atom or a methyl group; $R_4$ is oxygen atom or sulfur atom; $R_5$ is $NH_2$, hydroxy, unsubstituted $C_{1-18}$ alkoxy, $C_{2-100}$alkoxy interrupted by at least one N and/or O atom, hydroxy-substituted $C_{1-18}$alkoxy, unsubstituted $C_{1-18}$alkylamino, di($C_{1-18}$alkyl)amino, hydroxy-substituted $C_{1-18}$alkylamino, hydroxy-substituted di($C_{1-18}$alkyl)amino or —O—$CH_2$—$CH_2$—N($CH_3$)$_2$;

Y is the chain terminus of the polymer/copolymer $Z_n$ and Y represents the fragment of a polymerization initiator capable of initiating polymerization;

Y1 represents a di-, tri- or poly-valent fragment of a di-, tri-, or polyfunctional NMP initiator;

m is 2, 3 or 4, preferably 2;

n is the number of monomer units Z and is between 10 and 5000.

Definitions and Preferences

The Group $R_1$

The group $R_1$ is preferably hydrogen or methyl.

The group $R_2$

The group $R_2$ can be the functional end group of the vinyl hetero monomer.

The group $R_2$ is preferably a hydroxy group or an amino group which may be further reacted with any compound capable of reacting with an alcohol or amine, e.g. with a carboxylic acid, a dicarboxylic acid, a tricarboxylic acid, an acid anhydride, an isocyanate, a diisocyanate, an alkylhalogenide, an alkyl ester of an unsaturated carboxylic acid, an acid halogenide and the like.

Examples of compounds capable of reacting with the alcohol or amino group are: (meth)acryloyl chloride, (meth)acrylic anhydride, $C_1$-$C_4$ alkyl(meth)acrylate such as methyl methacrylate, 3-isopropenyl-α,α-dimethylbenzylisocyanate, maleic anhydride, succinic anhydride, phthalic anhydride, isophorone diisocyanate, 2,4-toluene-diisocyanate, triethoxy(3-isocyanatopropyl)silane, triethoxychlorosilane, epichlorohydrin.

The residue Ra—NHCOO—* is e.g. selected from 3-isopropenyl-α,α-dimethylbenzyl-isocyanate residue

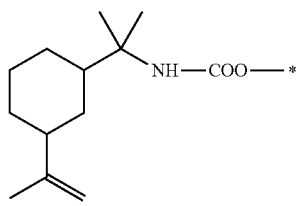

trimethoxy(3-isocyanatopropyl) silane or triethoxy(3-isocyanatopropyl) silane.

The diisocyanate residue *—OC—NH—Ra—NCO or *—OC—NH—Ra—NHCO—* is preferably selected from IPDI residue

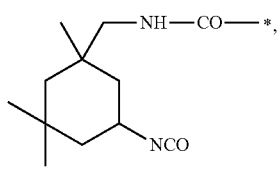

a substituted IPDI residue

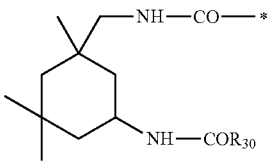

wherein $R_{30}$ is a residue of hydroxyethylacrylate ($CH_2$=CH—COO—($CH_2$)$_2$—O*), hydroxyethylmethacrylate ($CH_2$=C($CH_3$)—COO—($CH_2$)$_2$—O*), hydroxybutylacrylate ($CH_2$=CH—COO—($CH_2$)$_4$—O*) or hydroxybutylmethacrylate ($CH_2$=C($CH_3$)—COO—($CH_2$)$_4$—O*), a TDI residue

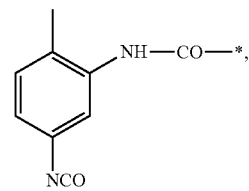

or from

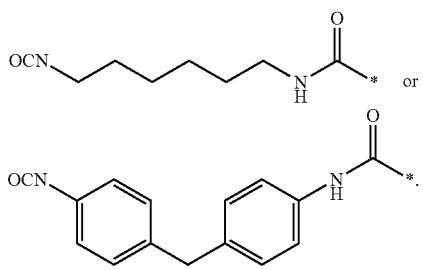

The term "silyl" for the group $R_2$ or $R_{20}$ is represented by the formula —Si$A_1A_2A_3$, where $A_1A_2A_3$ can be, independently, hydrogen or a substituted or unsubstituted alkyl, cycloalkyl, alkoxy, alkenyl, cycloalkenyl, alkynyl, cycloalkynyl, aryl, or heteroaryl group.

Examples are trimethoxysilyl (MeO)$_3$Si—*, triethoxysilyl (EtO)$_3$Si—* and (MeO)$_2$(CH$_3$)Si—*.

The above mentioned acid, acid anhydride, ester, isocyanate, alkylhalide or acid halogenide can also be substituted by a functional group.

Examples of residues $R_2$ are given in Tab. 1.

The Group Y

The group Y depends on the kind of living polymerization technique.

If RAFT technique is used, Y represents the fragment of a RAFT initiator whereby the initiator is selected from the group consisting of dithioesters, dithiocarbamates, trithiocarbonates and xanthates.

The initiator is, for example, 2-phenylprop-2-yl dithiobenzoate (Ph-C(CH$_3$,CH$_3$)—S—C(S)-Ph) or benzyl dithioacetate (Ph-CH$_2$—S—C(S)—CH$_3$) as described in WO-A-98/01478, or a carbamate such as, for example, benzyl 1-pyrrolecarbodithioate

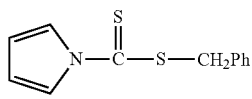

as described in WO99/31144; or
alkylxanthates such as, for example, ethyl α(O-ethylxanthyl propionate) as described in WO 98/58974.

If ATRP technique is used Y represents the fragment of a polymerization initiator whereby the initiator is selected from the group consisting of alpha,alpha'-dichloro- or alpha,alpha'-dibromoxylene, p-toluenesulfonylchloride (PTS), hexakis-(alpha-chloro- or alpha-bromomethyl)-benzene, 1-phenethyl chloride or bromide, methyl or ethyl 2-chloro- or 2-bromopropionate, methyl or ethyl-2-bromo- or 2-chloroisobutyrate, and the corresponding 2-chloro- or 2-bromopropionic acid, 2-chloro- or 2-bromoisobutyric acid, chloro- or bromoacetonitrile, 2-chloro- or 2-bromopropionitrile, alpha-bromo-benzacetonitrile, alpha-bromo-gamma-butyrolactone (=2-bromo-dihydro-2(3H)-furanone) and the initiators derived from 1,1,1-(tris-hydroxymethyl)propane and pentaerythritol of the formulae of above.

The above listed ATRP polymerisation initiator can have a functional group in addition to the group which initiates the polymerisation. Such additional functional group corresponds to the group $R_2$ as defined above. It is selected from the group consisting of a hydroxy, amino, epoxy, COOH, ester, amide, silyl group, an isocyanate group, a group represented by the general formula 3 or formula 4

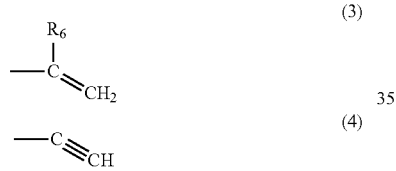

Preferred is the nitroxide mediated living polymerisation (NMP).

If NMP polymerisation is used Y is a fragment derived from an NMP initiator whereby the fragment is selected from the group consisting of —$CH_2$-phenyl, $CH_3CH$-phenyl, $(CH_3)_2C$-phenyl, $(C_{5-6}cycloalkyl)_2CCN$, $(CH_3)_2CCN$,

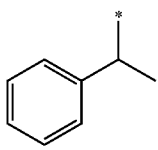

—$CH_2CH$=$CH_2$, —$CH_3CH_2$—$CH$=$CH_2$, $(C_{1-4})$alkyl-$CR_7$—C(O)-phenyl, $(C_{1-4})$alkyl-$CR_7$—C(O)—$(C_{1-4})$alkoxy, $(C_{1-4})$alkyl-$CR_7$—C(O)—$(C_{1-4})$alkyl, $(C_{1-4})$alkyl-$CR_7$—C(O)—N-di$(C_{1-4})$alkyl, $(C_{1-4})$alkyl-$CR_7$—C(O)—NH—$(C_{1-4})$alkyl, and $(C_{1-4})$alkyl-$CR_7$—C(O)—$NH_2$, wherein $R_7$ is hydrogen or $C_{1-4}$ alkyl.

A preferred fragment Y is

The above listed NMP initiator fragments can have an additional functional group $R'_2$ as defined above for the group $R_2$. Preferably, $R'_2$ is selected from the group consisting of hydroxy, epoxy, silyl, $NH_2$, $NH(C_1-C_6alkyl)$, $N(C_1-C_6alkyl)_2$, —CH=$CH_2$, —C≡CH, —C($CH_3$)=$CH_2$, —O—CH=$CH_2$, (—O—$CH_2$—$CH_2$)$_{1-10}$—OH, —$OR_{20}$, —$COOR_{20}$, —$CONHR_{20}$, —$OCONHR_{20}$, —$OCOR_{20}$ and —NH—CO—$R_{20}$, wherein $R_{20}$ is linear or branched $C_1$-$C_{20}$ alkyl or linear or branched $C_1$-$C_{20}$ alkyl substituted with hydroxy, epoxy, silyl, $NH_2$ or $N(C_1$-$C_6$alkyl)$_2$; or $R_{20}$ is phenyl, benzyl, —CH=$CH_2$, —C≡CH or —C($CH_3$)=$CH_2$, Such an NMP initiator is, for example,

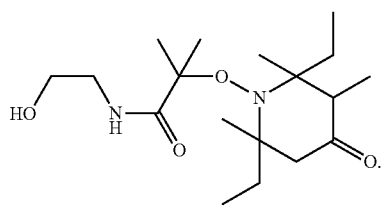 [SMILES: CCC1(C)CC(=O)C(C)C(C)(CC)N1OC(C)(C)C(=O)NCCO]

Thus, another preferred fragment Y is the group

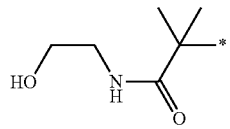 [SMILES: *C(C)(C)C(=O)NCCO]

The OH group in the above fragment can react further with any compound capable of reacting with an alcohol or amine, e.g. with an acid, an acid anhydride, an ester, an isocyanate, an alkylhalogenide, an acid halogenide and the like as described above Examples of residues Y are given in Tab. 1

In one embodiment a di-, tri or poly functional NMP initiator is used. Polymers of the formula (2) are prepared. Such initiators are described in WO 03/004471.

Examples of di-, tri or poly functional NMP initiators are the compounds of formulae Ia, Ib, Ic and Id

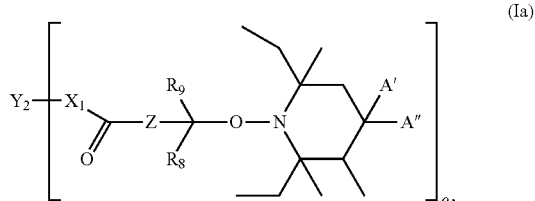

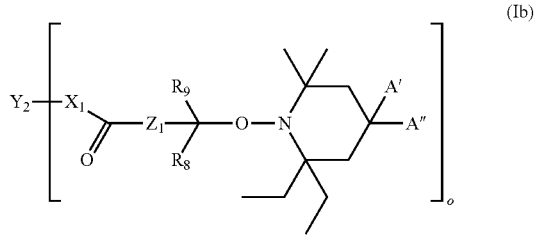

-continued

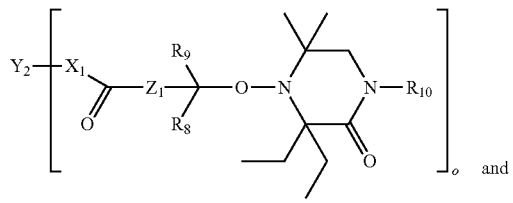

(Ic)

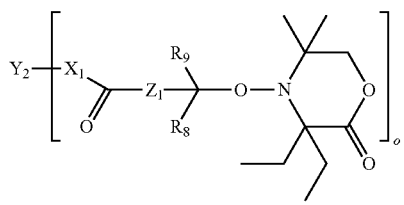

(Id)

wherein $R_8$ and $R_9$ are independently of each other hydrogen, $C_1$-$C_{18}$alkyl or phenyl;

$R_{10}$ is hydrogen, $C_1$-$C_{18}$alkyl, $C_1$-$C_{18}$alkyl which is substituted by OH, or phenyl which is unsubstituted or substituted by OH, halogen, $C_1$-$C_8$alkoxy or $C_1$-$C_8$alkyl;

$X_1$ is O, S, $NR_{11}$ or, if $Z_1$ is —O—$CH_2$—, $X_1$ is additionally a direct bond;
wherein $R_{11}$ is hydrogen or $C_1$-$C_{18}$alkyl;

$Z_1$ is a direct bond and if $R_8$ is hydrogen and $R_9$ phenyl, $Z_1$ is additionally —O—$CH_2$—;

$Y_2$ is a radical derived from a polyol, a polyamine, a polyaminoalcohol, a polyaminothiol, a polyhydroxythiol, a polyaminohydroxythiol or a polythiol having 2 to 20 —OH, SH and/or —$NR_{12}$H groups, wherein $R_{12}$ is hydrogen, $C_1$-$C_{18}$alkyl or phenyl; or if $X_1$ is a direct bond and $Z_1$ is —O—$CH_2$—, $Y_1$ is a radical derived from a polycarboxylic acid having 2-20 carboxylic functions;

A' and A" together are =O; or
A' is hydrogen; and
A" is hydrogen, —O—$R_{100}$, wherein $R_{100}$ is hydrogen, $C_1$-$C_{18}$alkyl which is uninterrupted or interrupted by one or more oxygen atoms, $NHR_{100}$, $NR_{100}R_{103}$ or cyanoethyl; or a group

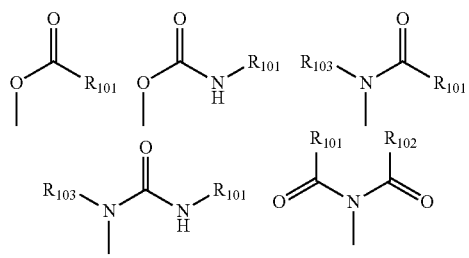

$R_{101}$ is hydrogen, —COOH, —COO($C_1$-$C_4$alkyl), —COO-phenyl, —COObenzyl, $C_1$-$C_8$alkoxy, $C_1$-$C_{18}$alkyl, $C_2$-$C_4$alkenyl, $C_1$-$C_{18}$alkyl or $C_2$-$C_4$alkenyl substituted by OH, —COOH, —COO($C_1$-$C_4$)alkyl, $C_2$-$C_{18}$alkyl which may be interrupted by one or more oxygen atom, unsubstituted cyclopentyl, cyclohexyl, cyclohexenyl, phenyl, naphthyl; cyclopentyl, cyclohexyl, cylohexenyl, phenyl or naphthyl which are substituted by $C_1$-$C_4$alkyl, —COOH or —COO—($C_1$-$C_4$alkyl), $R_{102}$ is hydrogen, $C_1$-$C_{18}$alkyl or $R_{101}$ and $R_{102}$ together with the nitrogen atom form a 5-membered ring which may have an unsaturated bond or be fused to a benzene ring;

$R_{103}$ is hydrogen or $C_1$-$C_{18}$alky; or

A' and A" together are a group

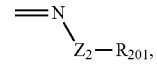

wherein $Z_2$ is O, $NR_{202}$ or when $R_{201}$ represents alkyl or aryl, $Z_2$ is additionally a direct bond;

$R_{202}$ is H, $C_1$-$C_{18}$alkyl or phenyl;

$R_{201}$ is H, straight or branched $C_1$-$C_{18}$alkyl or $C_3$-$C_{18}$alkenyl, which may be unsubstituted or substituted by one or more OH, $C_1$-$C_8$alkoxy, carboxy, $C_1$-$C_8$alkoxycarbonyl, $C_5$-$C_{12}$ cycloalkyl, $C_5$-$C_{12}$ cycloalkenyl; phenyl, $C_7$-$C_9$phenylalkyl or naphthyl which may be unsubstituted or substituted by one or more $C_1$-$C_8$alkyl, halogen, OH, $C_1$-$C_8$alkoxy, carboxy, $C_1$-$C_8$alkoxycarbonyl; or —C(O)—$C_1$-$C_{18}$alkyl, or an acyl moiety of an α,β-unsaturated carboxylic acid having 3 to 9 carbon atoms or of an aromatic carboxylic acid having 7 to 15 carbon atoms; —$SO_3^-Me^+$, —PO$(O^-Me^+)_2$, —P(O)(O$R_{13}$)$_2$, —$SO_2R_{13}$, —CO—NH—$R_{13}$, —$CONH_2$, COO$R_{13}$, or Si(Me)$_3$, wherein $Me^+$ is =$H^+$, ammonium or an alkali metal cation; wherein $R_{13}$ is hydrogen, $C_1$-$C_{18}$alkyl or phenyl, or A' is O—$Y_3$ and
A" is O—$Y_4$ forming a ketale structure in the 4 position;
wherein $Y_3$ and $Y_4$ are independently $C_1$-$C_{12}$alkyl, $C_3$-$C_{12}$alkenyl, $C_3$-$C_{12}$alkinyl, $C_5$-$C_8$ cycloalkyl, phenyl, naphthyl, $C_7$-$C_9$phenylalkyl; or $Y_3$ and $Y_4$ together form one of the bivalent groups —C($R_{301}$)($R_{302}$)—CH($R_{303}$)—, —CH($R_{301}$)—$CH_2$—C($R_{302}$)($R_{303}$)—, —CH($R_{302}$)—$CH_2$—C($R_{301}$)($R_{303}$)—, —$CH_2$—C($R_{301}$)($R_{302}$)—CH($R_{303}$)—, o-phenylene, 1,2-cyclohexylidene, —$CH_2$—CH=CH—$CH_2$— or

wherein $R_{301}$ is hydrogen, $C_1$-$C_{12}$alkyl, COOH, COO—($C_1$-$C_{12}$)alkyl or $CH_2OR_{304}$;

$R_{302}$ and $R_{303}$ are independently hydrogen, methyl, ethyl, COOH or COO—($C_1$-$C_{12}$)alkyl;

$R_{304}$ is hydrogen, $C_1$-$C_{12}$alkyl, benzyl, or a monovalent acyl residue derived from an aliphatic, cycloaliphatic or aromatic monocarboxylic acid having up to 18 carbon atoms.

and o is 2 to 8.

Suitable examples of di-, tri or poly functional NMP initiators are
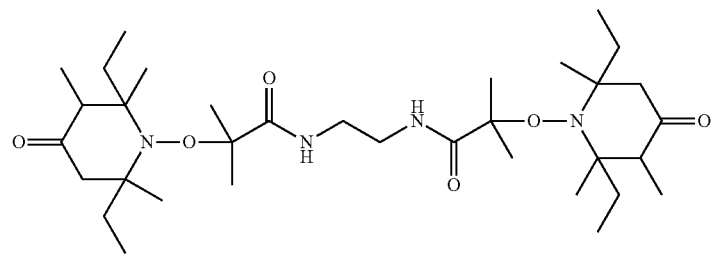
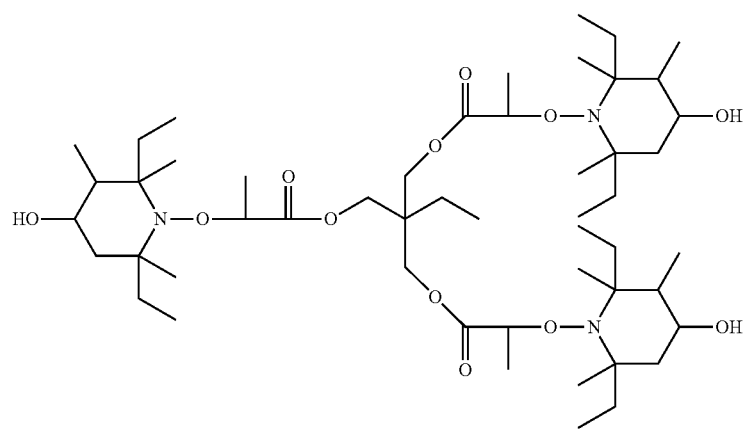
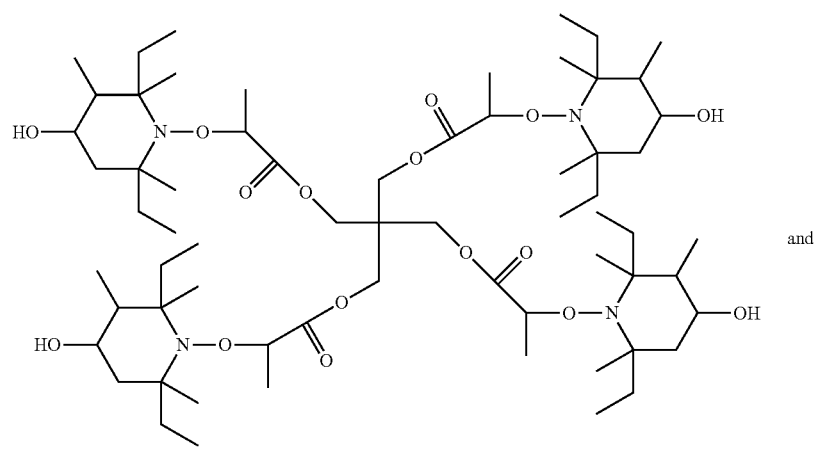
and -continued

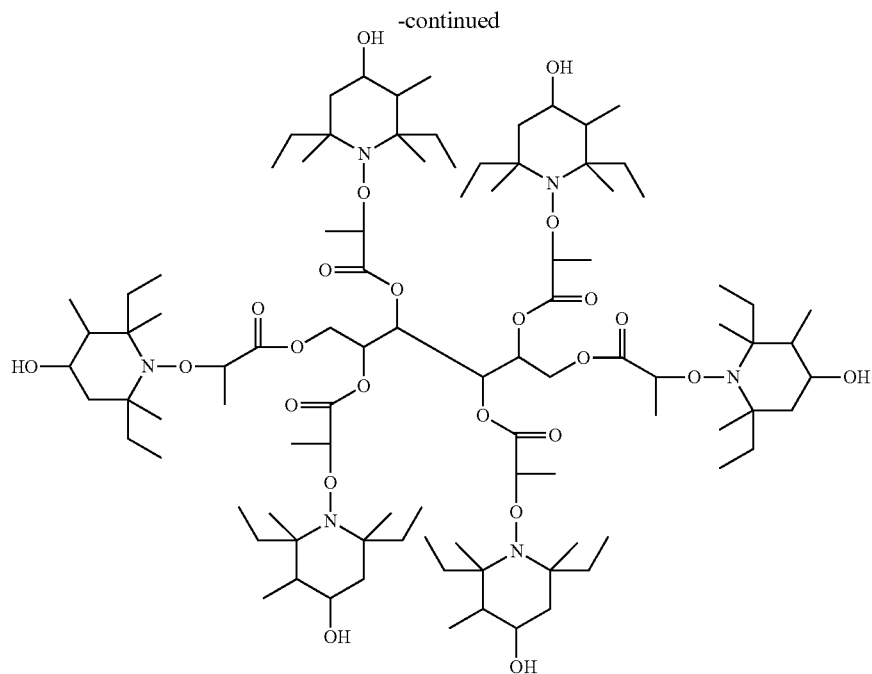

A preferred di-, tri or poly functional NMP initiator is the compound Ia, and in particular

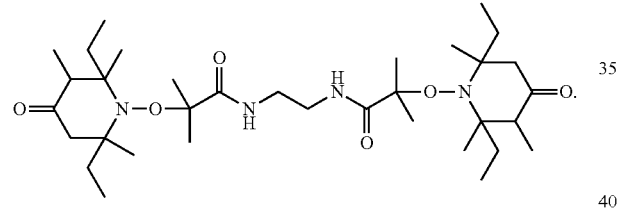

o is thus preferably 2.

$Y_1$ is preferably

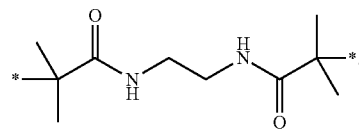

The Group X

The group X depends also on the kind of living polymerization technique.

If RAFT technique is used X is a sulphide.

If ATRP technique is used X is a halogen.

If NMP technique is used X is a nitroxide.

Nitroxides can derive from NMP initiators. Suitable NMP initiators are e.g. disclosed in WO 2005/059048.

The NMP initiators can be of formulae A, B or O

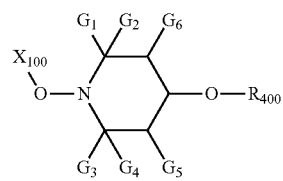
(A)

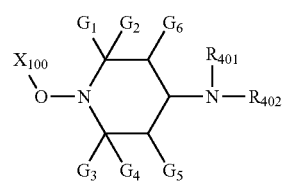
(B)

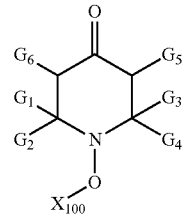
(O)

wherein $R_{400}$ is hydrogen, $C_1$-$C_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

$R_{401}$ is $C_1$-$C_{12}$alkyl, $C_5$-$C_7$cycloalkyl, $C_7$-$C_8$ aralkyl, $C_2$-$C_{18}$alkanoyl, $C_3$-$C_5$alkenoyl or benzoyl;

$R_{402}$ is $C_1$-$C_{18}$alkyl, $C_5$-$C_7$cycloalkyl, $C_2$-$C_8$alkenyl unsubstituted or substituted by a cyano, carbonyl or carbamide group, or is glycidyl, a group of the formula —CH$_2$CH(OH)—Z$_3$ or of the formula —CO—Z$_3$ or —CONH—Z$_3$ wherein Z$_3$ is hydrogen, methyl or phenyl;

G$_6$ is hydrogen,

G$_5$ is hydrogen or C$_1$-C$_4$alkyl,

G$_1$ and G$_3$ are methyl,

G$_2$ and G$_4$ are ethyl or propyl or

G$_1$ and G$_2$ are methyl and G$_3$ and G$_4$ are ethyl or propyl; and

X$_{100}$ is selected from the group consisting of
—CH$_2$-phenyl, CH$_3$CH-phenyl, (CH$_3$)$_2$C-phenyl, (C$_5$-C$_6$cycloalkyl)$_2$CCN, (CH$_3$)$_2$CCN,

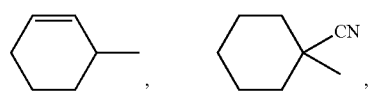

—CH$_2$CH=CH$_2$, CH$_3$CH—CH=CH$_2$ (C$_1$-C$_4$alkyl)CR$_{14}$—C(O)-phenyl, (C$_1$-C$_4$)alkyl-CR$_{14}$—C(O)—(C$_1$-C$_4$)alkoxy, (C$_1$-C$_4$)alkyl-CR$_{14}$—C(O)—(C$_1$-C$_4$)alkyl, (C$_1$-C$_4$)alkyl-CR$_{14}$—C(O)—N-di(C$_1$-C$_4$)alkyl, (C$_1$-C$_4$)alkyl-CR$_{14}$—C(O)—NH(C$_1$-C$_4$)alkyl, (C$_1$-C$_4$)alkyl-CR$_{14}$—C(O)—NH$_2$, wherein R$_{14}$ is hydrogen or (C$_1$-C$_4$)alkyl.

The above compounds and their preparation are described in GB2335190 and GB2361235.

Examples of NMP initiators are:

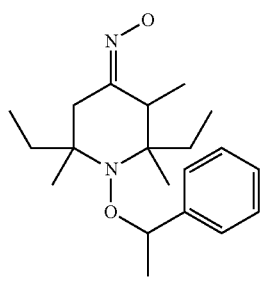
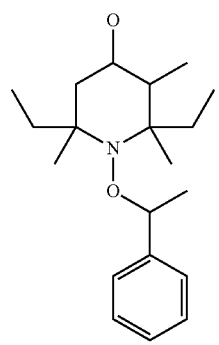

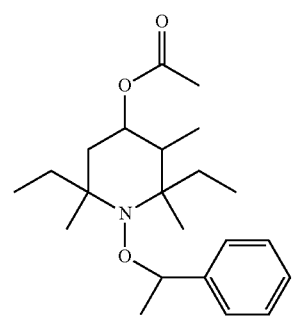
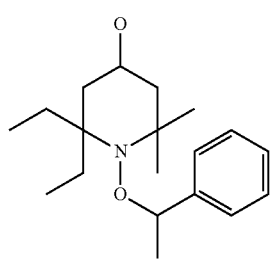

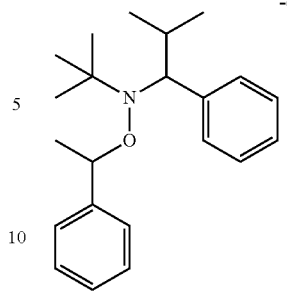
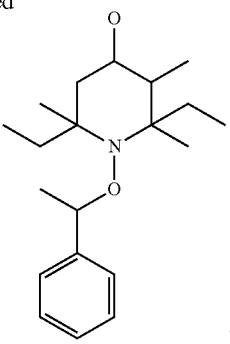

Thus, X can be a nitroxide of formulae A', B', or O'

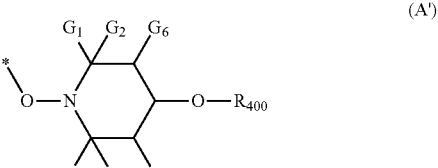 (A')

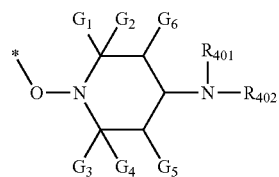 (B')

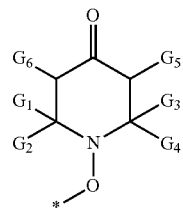 (O')

wherein

R$_{400}$ is hydrogen, C$_1$-C$_{18}$alkyl which is uninterrupted or interrupted by one or more oxygen atoms, cyanoethyl, benzoyl, glycidyl, a monovalent radical of an aliphatic carboxylic acid having 2 to 18 carbon atoms, of a cycloaliphatic carboxylic acid having 7 to 15 carbon atoms, or an α,β-unsaturated carboxylic acid having 3 to 5 carbon atoms or of an aromatic carboxylic acid having 7 to 15 carbon atoms;

R$_{401}$ is C$_1$-C$_{12}$alkyl, C$_5$-C$_7$cycloalkyl, C$_7$-C$_8$aralkyl, C$_2$-C$_{18}$alkanoyl, C$_3$-C$_5$alkenoyl or benzoyl;

R$_{402}$ is C$_1$-C$_{18}$alkyl, C$_5$-C$_7$cycloalkyl, C$_2$-C$_8$alkenyl unsubstituted or substituted by a cyano, carbonyl or carbamide group, or is glycidyl, a group of the formula —CH$_2$CH(OH)—Z$_3$ or of the formula —CO—Z$_3$ or —CONH—Z$_3$ wherein Z$_3$ is hydrogen, methyl or phenyl;

G$_6$ is hydrogen,

G$_5$ is hydrogen or C$_1$-C$_4$alkyl,

G$_1$ and G$_3$ are methyl,

G$_2$ and G$_4$ are ethyl or propyl, or

G$_1$ and G$_2$ are methyl and

G$_3$ and G$_4$ are ethyl or propyl.

Preferably, X is a nitroxide of formula 0', and in particular X is

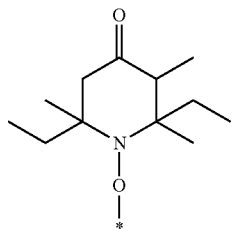 [SMILES: *ON1C(C)(CC)CC(=O)C(C)C1(C)CC]

The Group $Z_n$

The group $Z_n$ is the polymer main chain. The chain is preferably built up of styrenic monomers and/or acrylic and/or methacrylic monomers. $Z_n$ may be a homopolymer or a copolymer.

Preferably, $Z_n$ is built up from vinylic monomers selected from the group consisting of styrene and a compound of formula $CH_2=C(R_3)-C(=R_4)-R_5$, wherein $R_3$ is a hydrogen atom or a methyl group; $R_4$ is oxygen atom; $R_5$ is $NH_2$, hydroxy, unsubstituted $C_{1-18}$alkoxy, $C_{2-100}$alkoxy interrupted by at least one N and/or O atom, hydroxy-substituted $C_{1-18}$alkoxy, unsubstituted $C_{1-18}$alkylamino, di($C_{1-18}$alkyl)amino, hydroxy-substituted $C_{1-18}$alkylamino, hydroxy-substituted di($C_{1-18}$alkyl)amino or $-O-CH_2-CH_2-N(CH_3)_2$.

More preferably, $Z_n$ is built up from vinylic monomers selected from the group consisting of n-butyl acrylate, 2-ethylhexyl acrylate and styrene.

$Z_n$ is preferably a polymer or copolymer segment which is built up from monomers selected from the group consisting of styrene, substituted styrene and a compound of formula $CH_2=C(H, CH_3)-C(=O)-R_5$, wherein $R_5$ is $NH_2$, unsubstituted $C_{1-18}$alkoxy, $C_{2-100}$alkoxy interrupted by at least one N and/or O atom, or hydroxyl-substituted $C_{1-18}$alkoxy, unsubstituted $C_{1-18}$alkylamino, di($C_{1-18}$alkyl)amino, hydroxyl-substituted $C_{1-18}$alkylamino, or hydroxyl-substituted di($C_{1-18}$alkyl)amino, or $-O-CH_2-CH_2-N(CH_3)_2$; more preferably styrene, substituted styrene, or a compound of formula $CH_2=C(H, CH_3)-C(=O)-R_5$, wherein $R_5$ is unsubstituted $C_{1-18}$alkoxy, $C_{2-100}$alkoxy interrupted by at least one N and/or O atom, or hydroxyl-substituted $C_{1-18}$alkoxy.

The Group A

Group A is derived from the vinyl hetero monomer.

A is a divalent group or if M is a direct bond and $R_2$ is silyl, A is a direct bond and the vinyl hetero monomer is a vinyl silane.

If A is oxygen ($-O-$), the vinyl hetero monomer is a vinyl ether.

If A is sulphur ($-S-$), the vinyl hetero monomer is a vinyl thio ether.

If A is nitrogen ($-NH-$), the vinyl hetero monomer is a vinyl amine.

If A is silicon ($-SiH_2-$), the vinyl hetero monomer is a vinyl silane.

Preferably A is oxygen and the vinyl hetero monomer is thus a vinyl ether.

The vinylether is preferably selected from 1,4-butanediol vinyl ether, ethylene glycol vinyl ether, di(ethylene glycol) vinyl ether, 2-aminoethyl vinyl ether, 3-amino-1-propanol vinyl ether, 1,4-butanediol divinyl ether, ethylene glycol divinyl ether, di(ethylene glycol) divinyl ether, tris(trimethylsilyl)silyl vinyl ether, glycidyl vinyl ether, and the like.

The Group M

Group M is a bond or a divalent group linking the heteroatom of the vinyl hetero monomer and the functional end group of the vinyl hetero monomer.

If M is an alkylene group, M is a linear or branched alkylene chain, preferably a $C_1$-$C_{12}$alkylene chain, more preferably a $C_1$-$C_6$alkylene chain. An example for a branched alkylene chain is 2-ethylhexylene. The alkylene chain my also be a cyclic alkylene chain, e.g. 1,4 cyclohexanedimethylene.

If M is a $C_1$-$C_{50}$ heteroalkylene chain, it is e.g. an ethylene glycol, diethylene glycol, triethylene glycol chain or is $-CH_2$-cyclohexylene-$CH_2-$;

If M is arylene, it is e.g. phenylene, naphtylene.

If M is heteroarylene, it is e.g. pyridylene.

Process

The polymer or copolymer of the formula 1 or 2 may be produced by adding a functional vinyl hetero monomer to a living radical polymerization system during polymerization or after completion of polymerization.

Preferably, the polymer or copolymer of the formula 1 or 2 is produced by adding a functional vinyl hetero monomer to a living radical polymerization system.

The living radical polymerization system can be of formula 5 or 6

wherein Y, $Z_n$, X, $Y_1$, n and m have the same meaning as depicted above for the compounds of formulae (1) and (2).

Preferably, the functional vinyl hetero monomer is reacted with a living radical polymerization system at a temperature of above 80° C. Non-reacted functional vinyl hetero monomer may be removed, for example by distillation.

The living radical polymerization system of formula 5 or 6

wherein Y, $Z_n$, X, $Y_1$, n and m have the same meaning as depicted above for the compounds of formulae (1) and (2), may be prepared by reacting Y—X with at least one vinylic monomer.

The vinylic monomer may be selected from the group consisting of isoprene, 1,3-butadiene, α-$C_{5-18}$alkene, 4-vinyl-pyridine, 2-vinyl-pyridine, vinyl-imidazole, N-vinyl-pyrrolidone, dimethyl acrylamide, 3-dimethylamino-propylmethacrylamide, styrene, substituted styrene and a compound of formula $CH_2=C(R_3)-C(=R_4)-R_5$, wherein $R_3$ is a hydrogen atom or a methyl group; $R_4$ is oxygen atom or sulfur atom; $R_5$ is $NH_2$, hydroxy, unsubstituted $C_{1-18}$alkoxy, $C_{2-100}$alkoxy interrupted by at least one N and/or O atom, hydroxy-substituted $C_{1-18}$alkoxy, unsubstituted $C_{1-18}$alkylamino, di($C_{1-18}$alkyl)amino, hydroxy-substituted $C_{1-18}$alkylamino, hydroxy-substituted di($C_{1-18}$alkyl) amino or $-O-CH_2-CH_2-N(CH_3)_2$.

Non-reacted vinylic monomer may be removed, for example by distillation.

In one embodiment the functional vinyl hetero monomer is a functional vinyl ether.

An example of the process is the following reaction:

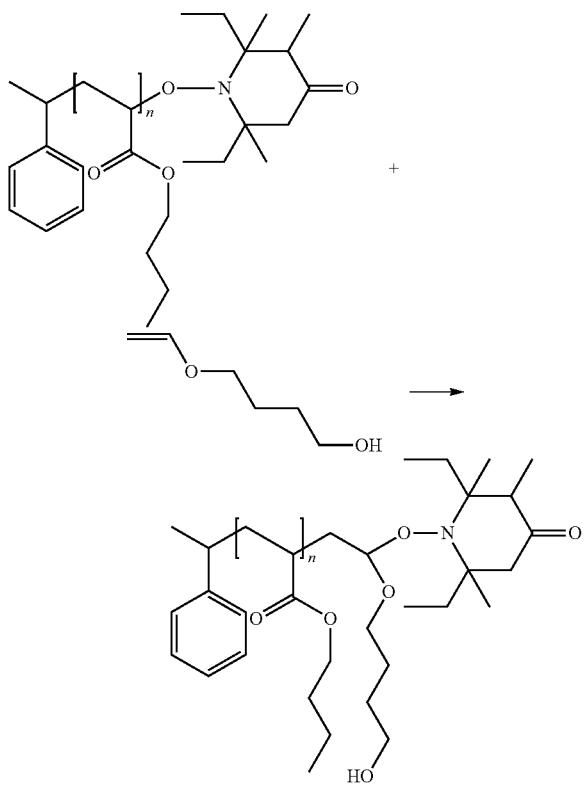

The polymer produced has a molecular weight between 1000 and 200,000 g/mol and a polydispersity of between 1.0 and 2.5, preferably 1.0 and 1.5.

A hydroxyl-terminated polymer or copolymer ($R_2$=OH) is prepared by adding a hydroxyl vinyl ether to a living polymerization system.

An amino terminated polymer or copolymer ($R_2$=$NH_2$, NH($C_1$-$C_6$alkyl) or N($C_1$-$C_6$alkyl)$_2$) is prepared by adding an amino vinyl ether to a living polymerization system.

An alkenyl-terminated polymer or copolymer is prepared by adding a divinyl ether monomer to a living polymerization system, preferably adding 1,4 butanediol divinyl ether.

An alkenyl-terminated polymer or copolymer is prepared by reacting a hydroxyl terminated polymer or copolymer prepared as described above or by reacting an amino-terminated polymer or copolymer prepared as described above with a compound having a vinyl group and a functional group capable of reacting with the hydroxyl or amino group, said compound being selected from the group consisting of (meth)acryloyl chloride, (meth)acrylic anhydride, $C_1$-$C_4$-alkyl(meth)acrylate and 3-isopropenyl-α,α-di-methylbenzyl isocyanate.

A carboxylic acid-terminated polymer or copolymer is prepared by reacting a hydroxyl- or amino terminated polymer or copolymer prepared as described above with a cyclic anhydride compound, preferably maleic anhydride, succinic anhydride, phthalic anhydride.

A silyl-terminated polymer or copolymer is prepared by reacting a hydroxyl terminated polymer or copolymer prepared as described above or by reacting an amino-terminated polymer or copolymer prepared as described above with a compound having a silyl group and a functional group capable of reacting with the hydroxyl or amino group said compound being selected from the group consisting of trimethoxy(3-isocyanatopropyl) silane, triethoxy(3-isocyanatopropyl) silane and triethoxychlorosilane.

A silyl-terminated polymer or copolymer is prepared by reacting an alkenyl-terminated polymer or copolymer prepared as described above with a silyl containing hydrosilyl compound, preferably with dimethoxymethylhydrosilane.

A silyl-terminated polymer or copolymer is prepared by adding a vinyl silane to a living radical polymerization system, preferably adding vinyltrimethoxysilane or vinyltriethoxysilane.

An epoxy-terminated polymer or copolymer is prepared by reacting a hydroxyl-terminated polymer or copolymer as described above with epichlorohydrin.

An isocyanate-terminated polymer or copolymer is prepared by reacting a hydroxyl- or amino-terminated polymer or copolymer prepared as described above with diisocyanate monomer, such as isophorone diisocyanate, 2,4-toluenediisocyanate, hexamethylene diisocyanate and methylene diphenyl diisocyanate.

Use

The end functionalized living polymers can be used as building blocks in industrial applications such as resins, adhesives, sealants binders, crosslinkers, inks, plastics, coatings, foams, epoxies and the like.

EXAMPLES

Experimental

Gel Permeation Chromatography (GPC):

The eluent is THF at a flow rate of 1.0 mL/min. The calibration curve is based on polystyrene standards.

Solid Content:

Solid content is tested using Halogen HB43 apparatus at 200° C. for 10 min.

Determining of Functionality:

$^1$H NMR spectroscopy is performed in 5 mm diameter tubes in $CDCl_3$ at 25° C. using a Bruker Avance 500 (500 MHz) spectrometer. The chemical shift scale is calibrated on the basis of the solvent peak (δ=7.26 ppm). In order to determine the OH functionality, two drops of trifluoroacetic anhydride are added into the tubes and the signal of the now downfield shifted $CF_3COOCH_2$— protons are integrated.

Intermediate 1: Living Controlled Polybutylacrylate: PnBA30-NOR

The mixture of 76.8 g n-butylacrylate (nBA, 0.6 mol), and 3.2 g of NOR regulator I (0.01 mol) (prepared as described in WO 2008/003602) is stirred under nitrogen at room temperature for 30 min firstly, and then is heated at 125° C. until the solid content (SC) of 51%. Residual nBA monomer is removed under 5 mbar vacuum (at 60° C. for 2 hr). Finally, a yellowish free-flowing living controlled poly (nBA) is obtained (SC of 98%). GPC: Mn=3550 g/mol, PD=1.19.

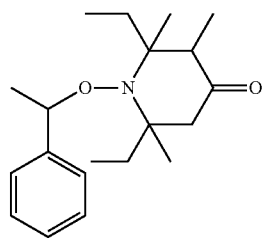 [SMILES: CCC1(C)CC(=O)C(C)C(C)(CC)N1OC(C)c1ccccc1]

NOR Regulator I

Intermediate 2: Living Controlled Poly(nBA): NOR-PnBA30-NOR

The mixture of 76.8 g nBA (0.6 mol), and 6.2 g of NOR regulator II (0.01 mol) (prepared as described below) is stirred under nitrogen at room temperature for 30 min firstly, and then is heated at 125° C. until the SC of 51%. Residual n-BA monomer is removed under 5 mbar vacuum (at 60° C. for 2 hr). Finally, a yellowish free-flowing living controlled poly(nBA) is obtained (SC of 98%). GPC: Mn=3650 g/mol, PD=1.21.

NOR Regulator II:

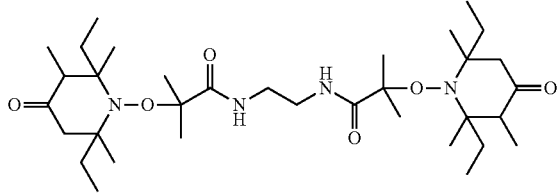 [SMILES: CCC1(C)CC(=O)C(C)C(C)(CC)N1OC(C)(C)C(=O)NCCNC(=O)C(C)(C)ON1C(C)(CC)CC(=O)C(C)C1(C)CC]

Preparation of the NOR Regulator II

To the solution of 6.37 g (0.03 mol) 2,6-diethyl-2,3,6-trimethylpiperidin-4-on-N-oxyl (prepared according to WO 2004/085397) in 40 mL ethanol are added 5.2 g (0.03 mol) N,N,N',N'',N''-pentamethyltriethylene diamine, 1.19 g (0.012 mol) CuCl and 0.19 g (0.003 mol) Cu. To the stirred mixture is then during 5 minutes added the solution of 5 g (0.014 mol) N,N'-2-bromoiso-butyroyl-1,2-diaminoethane (prepared according to Kruger, H. J.; Peng, G.; Holm, R. H. *Inorganic Chemistry* (1991), 30(4), 734-42) in 70 mL ethanol. The mixture is then stirred 40 h at room temperature and evaporated on a rotary evaporator. The residue is treated with 100 mL ethyl acetate and filtrated. The filtrate is successively washed with 200 mL water, 200 mL 2% EDTA solution, dried over $Na_2SO_4$ and evaporated. The crude product is purified on a silica gel column (hexane/ethyl acetate 8:2) to afford 8.27 g of the NOR regulator II as a light yellow resin. MS for $C_{34}H_{64}N_4O_6$ (622.90) found $M^+$=622.

Intermediate 3: Living Controlled Mono-OH Functional Poly(nBA): HO-PnBA35-NOR

The mixture of 89.6 g nBA (0.7 mol), and 3.5 g of NOR regulator III (0.01 mol) (described as intermediate for compound 3 of WO 2005/118651, page 26) is stirred under nitrogen at room temperature for 30 min firstly, and then is heated at 125° C. until the SC of 51%. Residual n-BA monomer is removed under 5 mbar vacuum (at 60° C. for 2 hr). Finally, a yellowish free-flowing living controlled poly (nBA) is obtained (SC of 98%). GPC: Mn=5000 g/mol, PD=1.20; OH functionality: 1.0.

NOR Regulator III:

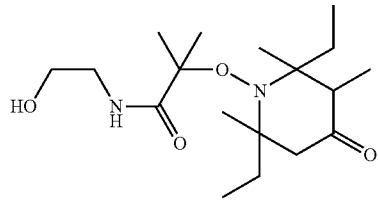 [SMILES: CCC1(C)CC(=O)C(C)C(C)(CC)N1OC(C)(C)C(=O)NCCO]

Intermediate 4: Living Controlled Poly(nBA-b-Styrene): PnBA30-b-PSt10-NOR

The mixture of 71.0 g Intermediate 1 (0.02 mol), and 41.6 g styrene (St, 0.4 mol) is stirred under nitrogen at room temperature for 30 min firstly, and then is heated at 125° C. until the SC of 82%. Residual St monomer is removed under 5 mbar vacuum (at 60° C. for 2 hr). Finally, a yellowish viscous living controlled poly(nBA-b-St) is obtained (SC of 98%). GPC: Mn=4350 g/mol, PD=1.25.

Intermediate 5: Living Controlled Mono-OH Functional Poly(nBA): HO-PnBA270-NOR

The mixture of 691 g nBA (5.4 mol), and 3.5 g of NOR regulator III (0.01 mol) is stirred under nitrogen at room temperature for 30 min firstly, and then is heated at 125° C. until a SC of 51% is reached. Residual n-BA monomer is removed under 5 mbar vacuum (at 60° C. for 2 hr). Finally, a yellowish viscous living controlled poly(nBA) is obtained (SC of 98%). GPC: Mn=28,000 g/mol, PD=1.30; OH functionality: 1.0.

Intermediate 6: Living Controlled Mono-OH Functional Poly(nBA-b-Styrene): HO-PnBA35-b-PSt10-NOR The mixture of 100 g Intermediate 3 (0.02 mol), and 41.6 g St (0.4 mol) is stirred under nitrogen at room temperature for 30 min firstly, and then is heated at 125° C. until a SC of 85% is reached. Residual St monomer is removed under 5 mbar vacuum (at 60° C. for 2 hr). Finally, a yellowish viscous living controlled HO-poly(nBA-b-St)-NOR is obtained (SC of 98%). GPC: Mn=6100 g/mol, PD=1.25. OH functionality: 1.0.

The table 1 below shows the residues of polymers of the formula 1 wherein $R_1$ is hydrogen and A is oxygen, M is —$(CH_2)_4$—, $Z_n$ is nBA and X is

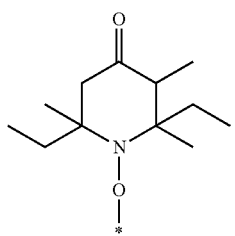

The following general polymer is obtained.

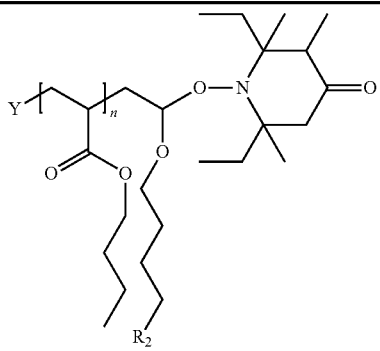

| Ex. | R₂ | Y |
|---|---|---|
| 1 | OH | *-CH(CH₃)-C₆H₅ |
| 3, 12 | OH | HO-CH₂CH₂-NH-CO-C(CH₃)₂-* |
| 6 | HOOC—CH₂—CH₂—COO—* | HOOC—CH₂—CH₂—COO-CH₂CH₂-NH-CO-C(CH₃)₂-* |
| 7 | CH₂=CH—COO—* | CH₂=CH—COO-CH₂CH₂-NH-CO-C(CH₃)₂-* |
| 8 | isophorone-CH₂-NH-COO-*; NHCOO-CH₂-CH₂-OOC-CH=CH₂ | isophorone-CH₂-NH-COO-CH₂-CH₂-NH-CO-C(CH₃)(CH₃)-*; NHCOO-CH₂-CH₂-OOC-CH=CH₂ |
| 9, 13 | (Et—O)₃—Si—(CH₂)₃—NH—COO—* | (EtO)₃—Si—(CH₂)₃—NH—COO-CH₂CH₂-NH-CO-C(CH₃)₂-* |
| 14 | CH₂=C(CH₃)—COO—* | *-CH(CH₃)-C₆H₅ |
| 15 | CH₂=CH—COO—* | *-CH(CH₃)-C₆H₅ |

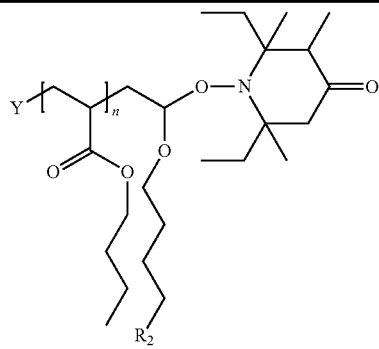

| Ex. | R₂ | Y |
|---|---|---|

Example 1: Controlled Poly(nBA30) End Functionalized with OH Group

A Polymer of the Formula (1)

The mixture of 35.5 g Intermediate 1 (0.01 mol), and 11.6 g 1,4-butanediol vinyl ether (0.1 mol) is stirred under nitrogen at room temperature for 30 min firstly, and then is heated at 130° C. for 3 hr. Residual 1,4-butanediol vinyl ether monomer is removed under 5 mbar vacuum (at 130° C. for 2 hr). Finally, a yellowish free-flowing controlled poly (nBA30) end functionalized with OH group is obtained (SC of 99%). GPC: Mn=3750 g/mol, PD=1.23. OH functionality: 1.1.

Example 2: Controlled OH Telechelic Poly(nBA30)

Compound of Formula 2, $R_2$ is OH

The mixture of 36.5 g Intermediate 2 (0.01 mol), and 23.2 g 1,4-butanediol vinyl ether (0.2 mol) is stirred under nitrogen at room temperature for 30 min firstly, and then is heated at 130° C. for 3 hr. Residual 1,4-butanediol vinyl ether monomer is removed under 5 mbar vacuum (at 130° C. for 2 hr). Finally, a yellowish free-flowing controlled OH telechelic poly(nBA30) is obtained (SC of 99%). GPC: Mn=3850 g/mol, PD=1.27. OH functionality: 2.1.

Example 3: Controlled OH Telechelic Poly(nBA35)

The mixture of 50 g Intermediate 3 (0.01 mol), and 11.6 g 1,4-butanediol vinyl ether (0.1 mol) is stirred under nitrogen at room temperature for 30 min firstly, and then is heated at 130° C. for 3 hr. Residual 1,4-butanediol vinyl ether monomer is removed under 5 mbar vacuum (at 130° C. for 2 hr). Finally, a yellowish free-flowing controlled OH telechelic poly(nBA35) is obtained (SC of 99%). GPC: Mn=5350 g/mol, PD=1.23. OH functionality: 2.1.

Example 4: Controlled Poly(nBA30-b-St10) End Functionalized with OH Group

Compound of Formula 1 Wherein $Z_n$ is a Copolymer, $R_2$ is OH

The mixture of 43.5 g Intermediate 4 (0.01 mol), and 23.2 g 1,4-butanediol vinyl ether (0.1 mol) is stirred under nitrogen at room temperature for 30 min firstly, and then is heated at 130° C. for 3 hr. Residual 1,4-butanediol vinyl ether monomer is removed under 5 mbar vacuum (at 130° C. for 2 hr). Finally, a yellowish viscous controlled poly (nBA30-b-St10) end functionalized with OH group is obtained (SC of 99%). GPC: Mn=4550 g/mol, PD=1.30. OH functionality: 1.0.

Example 5: Controlled Vinyl Telechelic Poly(nBA30)

Compound of Formula 2, $R_2$ is —O—CH=CH₂

The mixture of 36.5 g Intermediate 2 (0.01 mol), and 28.4 g 1,4-butanediol divinyl ether (0.2 mol) is stirred under nitrogen at room temperature for 30 min firstly, and then is heated at 130° C. for 3 hr. Residual 1,4-butanediol divinyl ether monomer is removed under 1 mbar vacuum (at 140° C. for 2 hr). Finally, a yellowish free-flowing controlled vinyl telechelic poly(nBA30) is obtained (SC of 99%). GPC: Mn=3950 g/mol, PD=1.28. Vinyl functionality: 2.1.

Example 6: Controlled COOH Telechelic Poly(nBA35)

The mixture of 53.5 g Example 3 (0.01 mol), 2.0 g succinic anhydride (0.02 mol), and 0.1 g dibutyltin dilaurate is stirred under nitrogen at room temperature for 30 min firstly, and then is heated at 90° C. for 15 hr. A yellowish free-flowing controlled COOH telechelic poly(nBA35) is obtained (SC of 99%). GPC: Mn=5250 g/mol, PD=1.35. COOH functionality: 1.9.

Example 7: Controlled Alkenyl Telechelic Poly(nBA35)

The mixture of 53.5 g Example 3 (0.01 mol), 2.52 g acrylic anhydride (0.02 mol), 50 mL dried xylene, and 0.1 g dibutyltin dilaurate is stirred under nitrogen at room temperature for 30 min firstly, and then is heated at 90° C. for 15 hr. Xylene is removed under 10 mbar vacuum (at 100° C. for 2 hr). Finally, a yellowish free-flowing controlled alkenyl telechelic poly(nBA35) is obtained (SC of 99%). GPC: Mn=5550 g/mol, PD=1.36. Alkenyl functionality: 2.0.

Example 8: Controlled Alkenyl Telechelic Poly(nBA35)

The mixture of 53.5 g Example 3 (0.01 mol), 4.44 g isophorone diisocyanate (0.02 mol), 50 mL dried xylene, and 0.1 g dibutyltin dilaurate is stirred under nitrogen at room temperature for 30 min, and heated at 60° C. for 4 hr. Then, 2.32 g 2-hydroxyethyl acrylate (0.02 mol) is added and heated at 90° C. for 15 hr. Xylene is removed under 10 mbar vacuum (at 100° C. for 2 hr). Finally, a yellowish viscous controlled alkenyl telechelic poly(nBA35) is obtained (SC of 99%). GPC: Mn=5600 g/mol, PD=1.38. Alkenyl functionality: 1.9.

Example 9: Controlled Silyl Telechelic Poly(nBA35)

The mixture of 53.5 g Example 3 (0.01 mol), 4.95 g triethoxy(3-isocyanatorpropyl) silane (0.02 mol), and 0.1 g dibutyltin dilaurate is stirred under nitrogen at room temperature for 30 min firstly, and then is heated at 90° C. for 15 hr. Finally, a yellowish viscous controlled silyl telechelic poly(nBA35) is obtained. GPC: Mn=5600 g/mol, PD=1.35. Silyl functionality: 1.9.

Example 10: Controlled Silyl Telechelic Poly(nBA35)

Compound of Formula 2, $R_2$ is —O—CH—CH$_2$—Si—(CH$_3$)(OCH$_3$)$_2$

The mixture of 55.0 g Example 5 (0.01 mol), 2.55 mL dimethoxymethylhydrosilane (0.02 mol), 0.4 mL dimethylorthoformate, and $10^{-3}$ mmol chloroplatinic acid is stirred under nitrogen and heated at 100° C. for 3 hr. Finally, a yellowish free-flowing controlled silyl telechelic poly (nBA35) is obtained. GPC: Mn=5650 g/mol, PD=1.34). Silyl functionality: 1.9.

Example 11: Controlled Silyl Telechelic Poly(nBA30)

A Polymer of the Formula (1) Wherein M is a Bond, a is SI and $R_2$ is Methoxy

The mixture of 36.5 g Intermediate 2 (0.01 mol), 29.6 g vinyltrimethoxysilane (0.2 mol) is stirred under nitrogen at room temperature for 30 min firstly, and then is heated at 130° C. for 3 hr. Residual vinyltrimethoxysilane monomer is removed under 5 mbar vacuum (at 100° C. for 2 hr). Finally, a yellowish free-flowing controlled silyl telechelic poly (nBA30) is obtained (SC of 99%). GPC: Mn=3750 g/mol, PD=1.28. Silyl functionality: 2.0.

Example 12: Controlled OH Telechelic Poly(nBA270)

The mixture of 268 g Intermediate 5 (0.01 mol), and 23.2 g 1,4-butanediol vinyl ether (0.2 mol) is stirred under nitrogen at room temperature for 30 min firstly, and then is heated at 130° C. for 3 hr. Residual 1,4-butanediol vinyl ether monomer is removed under 5 mbar vacuum (at 130° C. for 2 hr). Finally, a yellowish viscous controlled OH telechelic poly(nBA270) is obtained (SC of 99%). GPC: Mn=32,000 g/mol, PD=1.35. OH functionality: 2.4.

Example 13: Controlled Silyl Telechelic Poly(nBA270)

The mixture of 320 g Example 12 (0.01 mol), 7.42 g triethoxy(3-isocyanatopropyl) silane (0.03 mol), and 0.3 g dibutyltin dilaurate is stirred under nitrogen at room temperature for 30 min firstly, and then is heated at 90° C. for 15 hr. Finally, a yellowish viscous controlled silyl telechelic poly(nBA270) is obtained. GPC: Mn=36,000 g/mol, PD=1.40. Silyl functionality: 2.4.

Example 14: Controlled Poly(nBA30) End Functionalized with Alkenyl Group

The mixture of 37.5 g Example 1 (0.01 mol), 1.54 g methacrylic anhydride (0.01 mol), 50 mL dried xylene, and 0.1 g dibutyltin dilaurate is stirred under nitrogen at room temperature for 30 min firstly, and then is heated at 90° C. for 15 hr. Xylene is removed under 10 mbar vacuum (at 100° C. for 2 hr). Finally, a yellowish free-flowing controlled poly(nBA30) end functionalized with alkenyl group is obtained (SC of 99%). GPC: Mn=3950 g/mol, PD=1.3. Alkenyl functionality: 1.0.

Example 15: Controlled Poly(nBA30) End Functionalized with Alkenyl Group

The mixture of 37.5 g Example 1 (0.01 mol), 128 g n-butyl acrylate (1.0 mol) and 0.1 g tetrabutyl titanate is stirred under nitrogen at room temperature for 30 min firstly, and then is heated at 100° C. for 8 hr. The formed 1-butanol and residual n-butyl acrylate is slowly removed under 10 mbar vacuum (at 100° C. for 2 hr). Finally, a yellowish

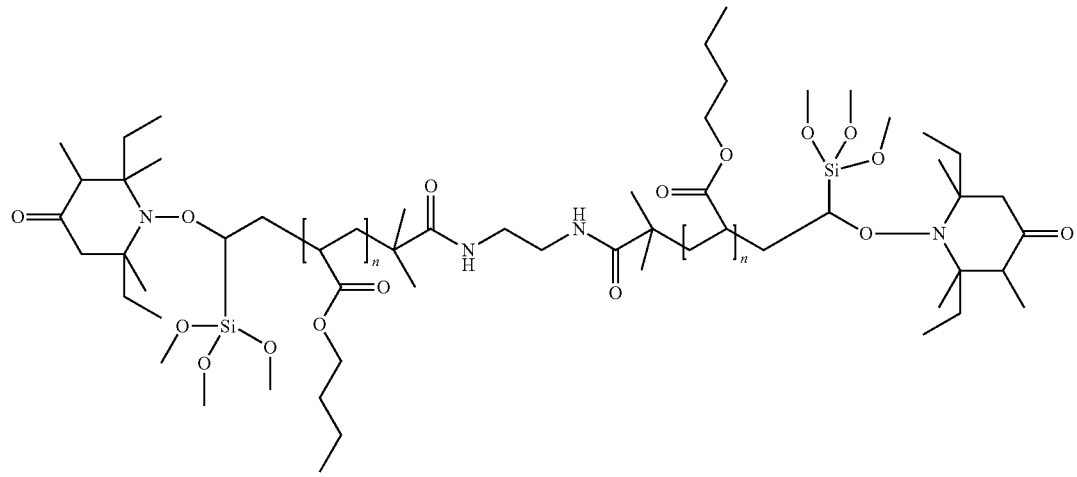

free-flowing controlled poly(nBA30) end functionalized with alkenyl group is obtained (SC of 99%). GPC: Mn=3850 g/mol, PD=1.3. Alkenyl functionality: 0.85.

Example 16: Controlled OH Telechelic Poly(nBA35-b-St10)

The mixture of 61 g Intermediate 6 (0.01 mol), and 23.2 g 1,4-butanediol vinyl ether (0.2 mol) is stirred under nitrogen at room temperature for 30 min firstly, and then is heated at 130° C. for 6 hr. Residual 1,4-butanediol vinyl ether monomer is removed under 5 mbar vacuum (at 130° C. for 2 hr). Finally, a yellowish viscous controlled OH telechelic poly(nBA35-b-St10) is obtained (SC of 99%). GPC: Mn=6250 g/mol, PD=1.28. OH functionality: 2.3.

The invention claimed is:
1. A polymer or copolymer of formula 1 or 2:

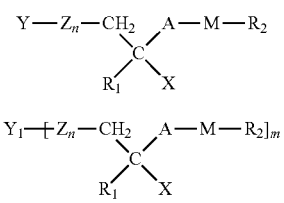

wherein:
R$_1$ is a hydrogen atom, a methyl group, or a radically non-polymerizable organic group containing 1 to 20 carbon atoms,
R$_2$ is a functional end group of a vinyl hetero monomer, wherein R$_2$ is selected from the group consisting of hydroxy, epoxy, NH$_2$, NH(C$_1$-C$_6$alkyl), N(C$_1$-C$_6$alkyl)$_2$, —CH═CH$_2$, a carbon triple-bonded to another carbon that is bonded to a hydrogen, —C(CH$_3$)═CH$_2$, —O—CH═CH$_2$, (—O—CH$_2$—CH)$_{1-10}$—OH, —OR$_{20}$, —COOR$_{20}$, —CONHR$_{20}$, —OCONHR$_{20}$, —OCOR$_{20}$, and —NH—CO—R$_{20}$, wherein R$_{20}$ is linear or branched C$_1$-C$_{20}$ alkyl or linear or branched C$_1$-C$_{20}$ alkyl substituted with hydroxy, silyl, NH$_2$ or N(C$_1$-C$_6$alkyl)$_2$; or R$_{20}$ is phenyl, benzyl, —CH═CH$_2$, a carbon triple-bonded to another carbon that is bonded to a hydrogen, or —C(CH$_3$)═CH$_2$:
A is selected from the group consisting of oxygen, nitrogen, sulfur, and silicon;
M is a direct bond or a divalent group selected from the group consisting of C$_{1-50}$ alkylene, C$_{1-50}$ (hetero)alkylene, arylene, and heteroarylene;
X is a nitroxide group;
Z$_n$ is a polymer or copolymer segment of random-, gradient-, or block-type structure, consisting of, in polymerized form, at least one vinylic monomer selected from the group consisting of isoprene, 1,3-butadiene, α-C$_{5-18}$alkene, 4-vinyl-pyridine, 2-vinyl-pyridine, vinyl-imidazole, N-vinylpyrrolidone, dimethyl acrylamide, 3-dimethylamino-propylmethacrylamide, styrene, substituted styrene, and a compound of formula CH$_2$═C(R$_3$)—C(═R$_4$)—R$_5$;
R$_3$ is a hydrogen atom or a methyl group;
R$_4$ is oxygen atom or sulfur atom;
R$_5$ is NH$_2$, hydroxy, unsubstituted C$_{1-18}$alkoxy, C$_{2-100}$alkoxy interrupted by at least one N atom or O atom or both, hydroxy-substituted C$_{1-18}$alkoxy, unsubstituted C$_{1-18}$alkylamino, di(C$_{1-18}$alkyl) amino, hydroxy-substituted C$_{1-18}$alkylamino, hydroxy-substituted di(C$_{1-18}$alkyl) amino, or —O—CH$_2$—CH$_2$—N(CH$_3$)$_2$;
Y is a fragment of an NMP initiator capable of initiating a nitroxide mediated living polymerization (NMP) selected from the group consisting of

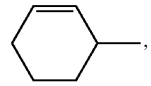

—CH$_2$CH═CH$_2$, (C$_{1-4}$)alkyl-CR$_7$—C(O)-phenyl, (C$_{1-4}$)alkyl-CR$_7$—C(O)—(C$_{1-4}$)alkoxy, (C$_{1-4}$)alkyl-CR$_7$—C(O)—(C$_{1-4}$)alkyl, (C$_{1-4}$)alkyl-CR$_7$—C(O)—N-di(C$_{1-4}$)alkyl, (C$_{1-4}$)alkyl-CR$_7$—C(O)—NH—(C$_{1-4}$)alkyl, and (C$_{1-4}$)alkyl-CR$_7$—C(O)—NH$_2$, wherein R$_7$ is hydrogen or C$_{1-4}$ alkyl;
Y$_1$ is a di-, tri-, or poly-valent fragment of a di-, tri-, or polyfunctional NMP initiator;
m is 2, 3, or 4; and
n is between 10 and 5000.

2. The polymer or copolymer of claim 1, wherein Z$_n$ consists of, in polymerized form, at least one vinylic monomer selected from the group consisting of styrene and a compound of formula CH$_2$═C(R$_3$)—C(═R$_4$)—R$_5$,
R$_3$ is a hydrogen atom or a methyl group;
R$_4$ is oxygen atom;
R$_5$ is NH$_2$, hydroxy, unsubstituted C$_{1-18}$alkoxy, C$_{2-100}$alkoxy interrupted by at least one N atom or O atom or both, hydroxy-substituted C$_{1-18}$alkoxy, unsubstituted C$_{1-18}$alkylamino, di(C$_{1-18}$alkyl) amino, hydroxy-substituted C$_{1-18}$alkylamino, hydroxy-substituted di(C$_{1-18}$alkyl) amino, or —O—CH$_2$—CH$_2$—N(CH$_3$)$_2$.

3. The polymer or copolymer of claim 2, wherein Z$_n$ consists of, in polymerized form, at least one vinylic monomer selected from the group consisting of n-butyl acrylate, 2-ethylhexyl acrylate, and styrene.

4. The polymer or copolymer of claim 1, wherein Z$_n$ consists of, in polymerized form, at least one compound of formula CH$_2$═C(R$_3$)—C(═R$_4$)—R$_5$, wherein:
R$_3$ is a hydrogen atom or a methyl group;
R$_4$ is oxygen atom; and
R$_5$ is NH$_2$, hydroxy, C$_{2-100}$alkoxy interrupted by at least one N atom or O atom or both, hydroxy-substituted C$_{1-18}$alkoxy, unsubstituted C$_{1-18}$alkylamino, di(C$_{1-18}$alkyl) amino, hydroxy-substituted C$_{1-18}$alkylamino, hydroxy-substituted di(C$_{1-18}$alkyl) amino, or —O—CH$_2$—CH$_2$—N(CH$_3$)$_2$.

5. The polymer or copolymer of claim 1, wherein R$_2$ is selected from the group consisting of hydroxy, —OCONHR$_{20}$, and —OCOR$_{20}$, wherein R$_{20}$ is linear or branched C$_1$-C$_{20}$ alkyl; a linear or branched C$_1$-C$_{20}$ alkyl substituted with hydroxy, silyl, NH$_2$, or N(C$_1$-C$_6$alkyl)$_2$; a phenyl; a benzyl; —CH═CH$_2$; a carbon triple-bonded to another carbon that is bonded to a hydrogen; or —C(CH$_3$)═CH$_2$.

6. The polymer or copolymer of claim 1, wherein Y is a fragment selected from the group consisting of (C$_{1-4}$)alkyl-CR$_7$—C(O)-phenyl, (C$_{1-4}$)alkyl-CR$_7$—C(O)—(C$_{1-4}$)alkoxy, (C$_{1-4}$)alkyl-CR$_7$—C(O)—(C$_{1-4}$)alkyl, (C$_{1-4}$)alkyl-CR$_7$—C(O)—N-di(C$_{1-4}$)alkyl, (C$_{1-4}$)alkyl-CR$_7$—C(O)—NH—(C$_{1-4}$)alkyl, and (C$_{1-4}$)alkyl-CR$_7$—C(O)—NH$_2$, wherein R$_7$ is hydrogen or C$_{1-4}$ alkyl.

7. The polymer or copolymer of claim 1, wherein a number average molecular weight of the polymer or copolymer is between 1000 and 200,000 g/mol and a polydispersity of the polymer or copolymer is between 1.0 and 2.5.

8. The polymer or copolymer of claim 7, wherein the polydispersity is between 1.0 and 1.5.

9. A process of preparing the polymer or copolymer of claim 1, comprising:
adding a functional vinyl hetero monomer to a living radical polymerization system, thereby obtaining a polymer or copolymer.

10. The process of claim 9, wherein the living radical polymerization system is of formula 5 or 6:

(5)

(6)

11. The process of claim 9, wherein $R_2$ is OH, and the adding comprises adding a hydroxy vinyl ether to the living polymerization system, thereby obtaining a hydroxy terminated polymer or copolymer.

12. The process of claim 9, wherein $R_2$ is $NH_2$, $NH(C_1$-$C_6alkyl)$ or $N(C_1$-$C_6alkyl)_2$ and the adding comprises adding an amino vinyl ether to the living polymerization system, thereby obtaining an amino terminated polymer or copolymer.

13. The process of claim 9, wherein $R_2$ is —O—CH=$CH_2$ and the adding comprises adding a divinyl ether to the living polymerization system, thereby obtaining an alkenyl-terminated polymer or copolymer.

14. The process of claim 13, wherein the divinyl ether is 1,4-butanediol divinyl either.

15. The process of claim 9, further comprising:
reacting the polymer or copolymer obtained in the adding with a compound selected from the group consisting of (meth)acryloyl chloride, (meth)acrylic anhydride, $C_1$-$C_4$-alkyl (meth)acrylate, and 3-isopropenyl-α,α-dimethylbenzyl isocyanate, thereby obtaining an alkenyl terminated polymer or copolymer,
wherein the adding comprises either adding a hydroxy vinyl ether to the living polymerization system, thereby obtaining a hydroxy terminated polymer or copolymer, or adding an amino vinyl ether to the living polymerization system, thereby obtaining an amino terminated polymer or copolymer.

16. The process of claim 9, further comprising:
reacting the polymer or copolymer obtained in the adding with a cyclic anhydride compound, thereby obtaining a carboxylic acid terminated polymer or copolymer,
wherein the adding comprises either adding a hydroxy vinyl ether to the living polymerization system, thereby obtaining a hydroxy terminated polymer or copolymer, or adding an amino vinyl ether to the living polymerization system, thereby obtaining an amino terminated polymer or copolymer.

17. The process of claim 9, further comprising:
reacting the polymer or copolymer obtained in the adding with a compound having a silyl group and a functional group capable of reacting with a hydroxyl or amino group, thereby obtaining a silyl terminated polymer or copolymer,
wherein the adding comprises either adding a hydroxy vinyl ether to the living polymerization system, thereby obtaining a hydroxy terminated polymer or copolymer, or adding an amino vinyl ether to the living polymerization system, thereby obtaining an amino terminated polymer or copolymer.

18. The process of claim 13, further comprising:
reacting the alkenyl-terminated polymer or copolymer with a hydrosilyl compound, thereby obtaining a silyl terminated polymer or copolymer.

19. The process of claim 9, wherein $R_2$ is silyl, and the adding comprises adding a vinyl silane to the living polymerization system, thereby obtaining a silyl-terminated polymer or copolymer.

20. The process of claim 11, further comprising:
reacting the hydroxy-terminated polymer or copolymer with epichlorohydrin, thereby obtaining an epoxy terminated polymer or copolymer.

21. The process of claim 9, further comprising:
reacting the polymer or copolymer obtained in the adding with diisocyanate monomer, thereby obtaining an isocyanate-terminated polymer or copolymer,
wherein the adding comprises either adding a hydroxy vinyl ether to the living polymerization system, thereby obtaining a hydroxy terminated polymer or copolymer, or adding an amino vinyl ether to the living polymerization system, thereby obtaining an amino terminated polymer or copolymer.

22. A process of producing a resin, adhesive, sealant, binder, crosslinker, ink, plastic, coating, foam, epoxy, or any combination thereof, the process comprising:
producing the resin, adhesive, sealant, binder, crosslinker, ink, plastic, coating, foam, epoxy, or a combination thereof with the polymer or copolymer of claim 1 as a building block.

* * * * *

UNITED STATES PATENT AND TRADEMARK OFFICE
CERTIFICATE OF CORRECTION

PATENT NO.       : 10,316,114 B2
APPLICATION NO.  : 13/638191
DATED            : June 11, 2019
INVENTOR(S)      : Huiguang Kou et al.

Page 1 of 2

It is certified that error appears in the above-identified patent and that said Letters Patent is hereby corrected as shown below:

On the Title Page

On page 2, Column 2, item (56), other publications, Line 7, "poly(vinyl ether)" should read -- poly(vinylether) --.

In the Specification

Column 6, Line 39, "described above" should read -- described above. --.

Column 7, Line 65, "cylohexenyl," should read -- cyclohexenyl, --.

Column 8, Line 6, "$C_1$-$C_{18}$alky;" should read -- $C_1$-$C_{18}$alkyl; --.

Column 8, Line 40, "$C_3$-$C_{12}$alkinyl," should read -- $C_3$-$C_{12}$alkynyl, --.
    Line 64, "atoms." should read -- atoms --.

Column 16, Line 9, "chain my also" should read -- chain may also --.

Column 22, Lines 45-50,

"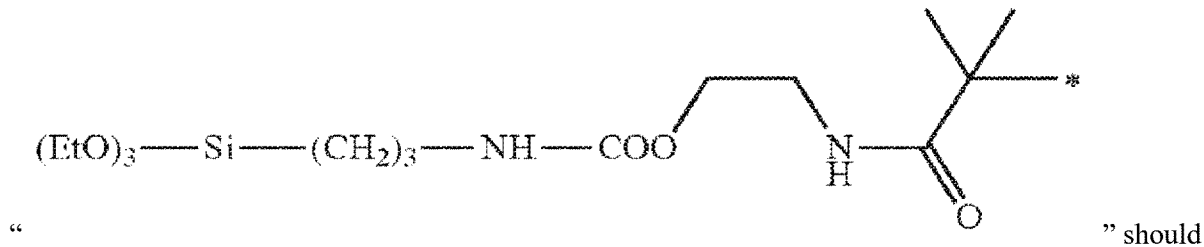" should

Signed and Sealed this
Twenty-third Day of June, 2020

Andrei Iancu
*Director of the United States Patent and Trademark Office*

CERTIFICATE OF CORRECTION (continued)
U.S. Pat. No. 10,316,114 B2 read --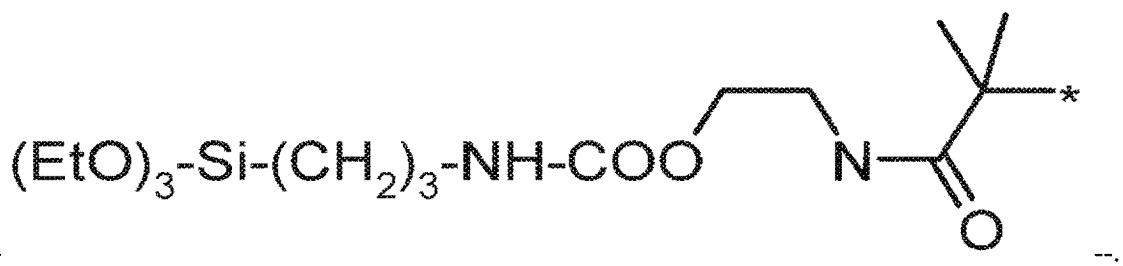--.

Columns 23-24, Lines 1-18 before Example 1,

"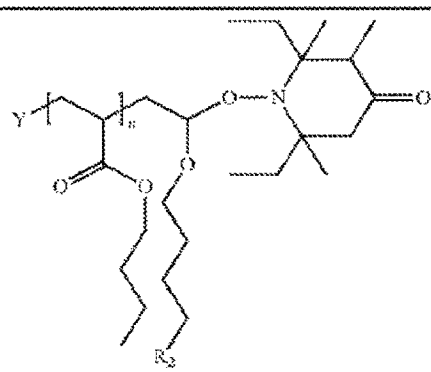"

should be deleted.

Column 25, Line 13, "(3-isocyanatorpropyl)" should read -- (3-isocyanatopropyl) --.